United States Patent
Wakahara et al.

(10) Patent No.: US 6,375,591 B1
(45) Date of Patent: Apr. 23, 2002

(54) FAULT DETERMINING DEVICE AND METHOD FOR HYDRAULICALLY OPERATED AUTOMATIC TRANSMISSION

(75) Inventors: Tatsuo Wakahara, Kawasaki; Kenichiro Murakami, Atsugi, both of (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/691,847

(22) Filed: Oct. 18, 2000

(30) Foreign Application Priority Data

Oct. 19, 1999 (JP) .............................. 11-296119

(51) Int. Cl.$^7$ .............................................. F16H 61/12
(52) U.S. Cl. ............................................... 475/119
(58) Field of Search .......................... 475/119; 477/906

(56) References Cited

U.S. PATENT DOCUMENTS 5,515,272 A * 5/1996 Sakai et al. ............... 364/424.1
5,957,800 A * 9/1999 Oba et al. ...................... 475/119

FOREIGN PATENT DOCUMENTS

JP 7-269685 10/1995

* cited by examiner

Primary Examiner—Dirk Wright
(74) Attorney, Agent, or Firm—Foley & Lardner (57) ABSTRACT

A valve (13, 14) causes fluid pressures to act individually on plural frictional elements (A, B) of an automatic transmission so as to selectively lock the rotation of the frictional elements (A, B). A control unit (21) determines that the automatic transmission has an interlock tendency when the fluid pressures acting on the frictional elements (A, B) detected by pressure sensors (24, 25) are both equal to or greater than a predetermined pressure. Completion of a gear position change-over is detected by a sensor (23, 26), and the control unit (21) does not determine the interlock tendency until a predetermined time Δt has elapsed after the gear position change-over is complete. In this way, an incorrect determination is prevented by avoiding the determination in a period when the pressures are unstable in a period immediately after the gear position change-over of the automatic transmission.

10 Claims, 6 Drawing Sheets

| GEAR | PRESSURE SWITCH 24 | PRESSURE SWITCH 25 | DETERMINATION RESULT | MEASURES |
|---|---|---|---|---|
| 1ST | ON | OFF | NORMAL | - |
| | ON | ON | INTERLOCK TENDENCY | RELEASE OF P1 |
| 2ND | OFF | ON | NORMAL | - |
| | ON | ON | INTERLOCK TENDENCY | RELEASE OF P2 |

FIG. 6

FAULT DETERMINING DEVICE AND METHOD FOR HYDRAULICALLY OPERATED AUTOMATIC TRANSMISSION

FIELD OF THE INVENTION

This invention relates to detection of faults in an automatic transmission operated by oil pressure.

BACKGROUND OF THE INVENTION

A multistage gear type automatic transmission changes a motive transmission path via a combination of various gears inside the transmission, by selectively locking or unlocking plural friction elements such as clutches and brakes by oil pressure control.

Tokkai Hei 7-269685 published by the Japanese Patent Office in 1995 discloses an automatic transmission wherein valves for locking and unlocking frictional elements are individually provided between the frictional elements and an oil pressure pump. Further, a pressure switch for detecting variation of oil pressure supplied to each of the frictional elements is disposed in passages connecting the valves and the frictional elements. The operation of the valves is controlled by an electronic control unit.

SUMMARY OF THE INVENTION

In an automatic transmission where locking and unlocking frictional elements is performed by valve operation according to command signals from an electronic control unit, it is desirable to verify whether or not the transmission is working properly in accordance with the command signals, i.e., to determine by some method whether or not there is a fault in the automatic transmission. If locking and unlocking of the frictional elements is performed by oil pressure, some time is required until the locking and unlocking of the frictional elements by a valve operation is actually completed. There is therefore a risk of an incorrect determination if the presence or absence of a fault is determined within this transient period.

It is therefore an object of this invention to accurately determine the presence or absence of a fault in an automatic transmission.

It is another object of this invention to accurately detect an interlock tendency of an automatic transmission.

It is yet another object of this invention to rapidly eliminate an interlock tendency of an automatic transmission.

In order to achieve the above objects, this invention provides a fault determining device for an automatic transmission which changes over a gear position by selectively applying a fluid pressure to one of plural frictional elements while releasing a fluid pressure acting on the other of the plural frictional elements. The device comprises a pressure sensor which detects a fluid pressure acting on each of the frictional elements, a sensor which detects a completion of a gear position change-over of the automatic transmission, and a microprocessor. The microprocessor is programmed to determine a fault of the automatic transmission based on a detected fluid pressure, and prohibit determination of the fault when the gear position change-over is not complete.

This invention also provides a fault determining method for an automatic transmission which changes over a gear position by selectively applying a fluid pressure to one of plural frictional elements while releasing a fluid pressure acting on the other of the plural frictional elements. The method comprises detecting a fluid pressure acting on each of the frictional elements, determining a fault of the automatic transmission based on the detected fluid pressure, determining whether or not a gear position change-over of the automatic transmission is complete, and prohibiting determination of the fault when the gear position change-over is not complete.

The details as well as other features and advantages of this invention are set forth in the remainder of the specification and are shown in the accompanying drawings.

DESCRIPTION OF THE PREFERRED EMBODIMENTS

Figure 1:
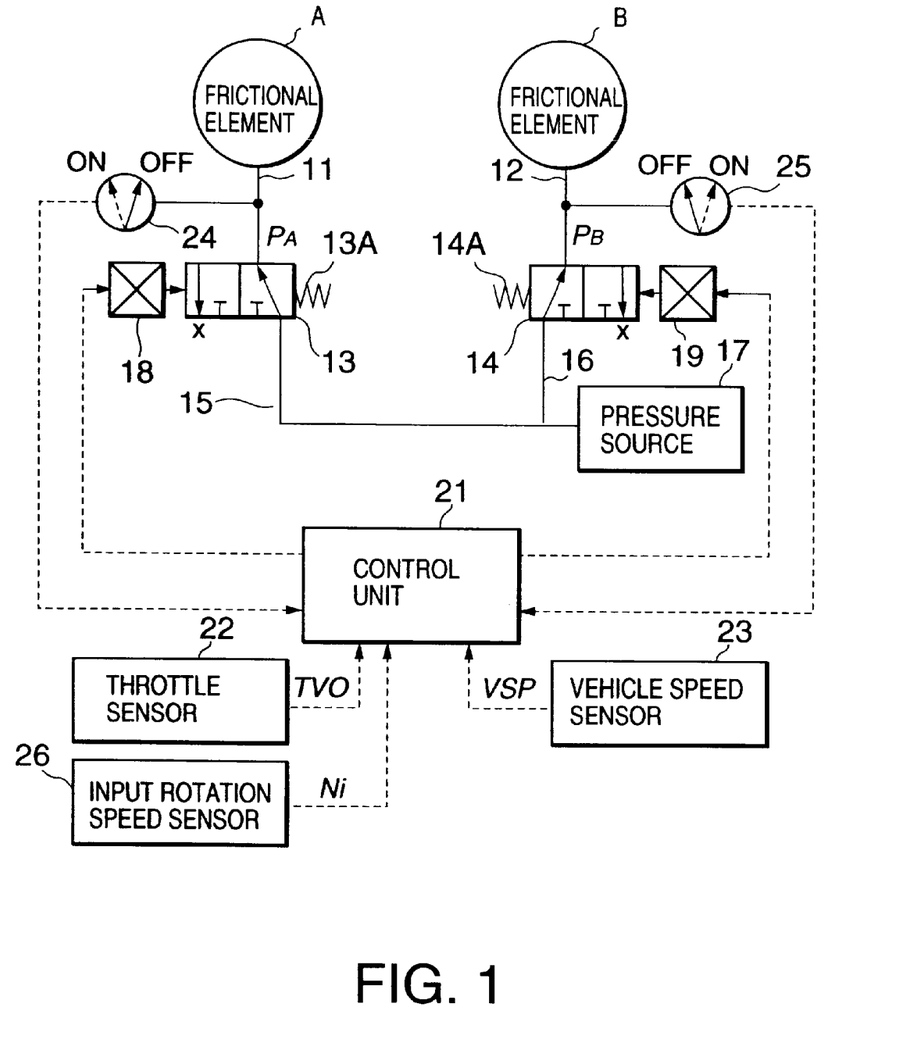
FIG. 1 is a schematic diagram of a speed ratio controller of an automatic transmission according to this invention.

Referring to FIG. 1 of the drawings, an automatic transmission for a vehicle comprises two frictional elements A and B.

The frictional element A is locked by an oil pressure supplied via a valve 13 from a pressure source 17, and is unlocked by releasing the oil pressure. The frictional element B is locked by an oil pressure supplied via a valve 14 from the pressure source 17, and is unlocked by releasing the oil pressure. Here, lock means a state where the frictional elements A, B are fixed to a housing which houses the frictional elements A, B. Unlock means a state where the fixing of the frictional elements A, B to the housing is released so that they can rotate freely.

The valve 13 comprises a three port, two position valve pushed by a spring 13A. In the normal state, the valve 13 is pressed by the spring 13A so that an oil pressure of an oil pressure source 17 acts on the frictional element A. A solenoid 18 is provided to the valve 13. The solenoid 18 is energized by a current from a control unit 21, and displaces the valve 13 against the spring 13A. Due to this displacement, the valve 13 releases the oil pressure acting on the frictional element A to a drain.

A valve 14 comprises a three port, two position valve pushed by a spring 14A. In the normal state, the valve 14 is pressed by the spring 14A so that the oil pressure of the oil pressure source 17 acts on the frictional element B. A solenoid 19 is provided to the valve 14. The solenoid 19 is energized by a current from the control unit 21, and displaces the valve 14 against the spring 14A. Due to this displacement, the valve 14 releases the oil pressure acting on the frictional element B to the drain.

Therefore, locking and unlocking of the frictional elements A, B are performed according to the energization of the solenoids 18, 19 by the control unit 21.

Figure 2:
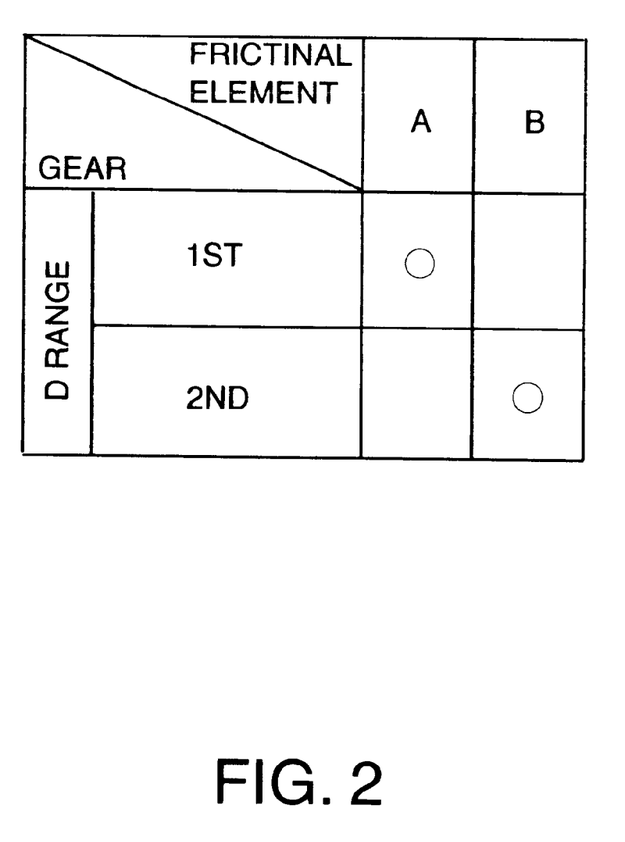
FIG. 2 is a table describing a relation between a lock state of frictional elements of the automatic transmission and a speed ratio.

Referring to FIG. 2, the automatic transmission implements first gear by locking the frictional element A and unlocking the frictional element B, and implements second gear by locking the frictional element B and unlocking the frictional element A. The vehicle is provided with a selector lever with which a driver selects an operation mode of the vehicle. The operation modes comprises a drive range (D), neutral range (N) and parking range (P). While the drive range (D) is selected and the vehicle is running, the control unit 21 selectively implements the first gear or second gear according to the running state.

I When the neutral range (N) is selected, both the frictional elements A, B are unlocked. In this state, all rotating elements of the automatic transmission are free to rotate. When the parking range (P) is selected, an interlock state obtains where both the frictional elements A, B are locked. In the interlock state, the rotation of all rotating elements of the automatic transmission is restricted.

Referring again to FIG. 1, to perform this control, detection values are input as signals to the control unit 21 respectively from a vehicle speed sensor which detects a vehicle speed VSP, a throttle sensor 22 which detects a throttle opening TVO of a vehicle engine, and an input rotation speed sensor 26 which detects an input rotation speed Ni of the automatic transmission. An output rotation speed No of the automatic transmission and the vehicle speed VSP are in a fixed relation, so the output rotation speed No of the automatic transmission is also detected by the vehicle speed sensor 23.

Detection pressures are also input into the control unit 21 as signals respectively from a pressure switch 24 which responds to a pressure acting on the frictional element A, and a pressure switch 25 which responds to a pressure acting on a frictional element B.

The pressure switch 24 outputs an ON signal when the pressure acting on the frictional element A exceeds a predetermined pressure Psw, and in other cases outputs an OFF signal. Likewise, the pressure switch 25 outputs an ON signal when the pressure acting on the frictional element B exceeds the predetermined pressure Psw, and in other cases outputs an OFF signal. Herein, the predetermined pressure Psw is set to a value less than the pressure of a return spring which elastically supports the frictional elements A, B against the oil pressure.

The control unit 21 comprises a microprocessor with a central processing unit (CPU), read-only memory (ROM), random access memory (RAM), and input/output interface (I/O interface).

When a driver has selected a drive range (D), the control unit 21 selects a target gear, i.e., first gear or second gear, by looking up a prestored gear selection map based on the input vehicle speed VSP and throttle opening TVO, and controls the valves 13, 14 so that the operation state of the automatic transmission, i.e., the application of the first gear or second gear, coincides with the selection result.

In the drive range (D), as shown in FIG. 2, a signal which locks both of the frictional elements A, B is not output from the control unit 21. However, when there is a fault or incorrect operation of any of the valves 13, 14, solenoids 18, 19 or pressure switches 24, 25, ON signals may be simultaneously input from the pressure switches 24, 25 to the control unit 21.

Further, signals showing the interlock tendency may be input when the pressures acting on both of the frictional elements A, B are really high. In the former case, there is no immediate effect on the running of the vehicle, but in the latter case, the frictional elements A, B exert a large resistance to running. An obstruction may arise if a certain amount of pressure is simultaneously supplied to the frictional elements A, B even if they are not completely locked. In this description, the term "interlock tendency" denotes a complete interlock state, as well as a partial interlock state where the rotation of the frictional elements A, B is not yet locked but both of them are under a pressure higher than the predetermined pressure Psw.

When ON signals are simultaneously input from the pressure switches 24, 25 while the vehicle is running, the automatic transmission is determined to have an interlock tendency. In this case, the pressure acting on the frictional element A or frictional element B must be released so that the vehicle can run without obstruction.

As described above, some time is required after the operation of the valves 13, 14 to the time when the frictional elements A, B are completely locked or unlocked. If it is determined whether or not there is an interlock tendency by the signals from the pressure switches 24, 25 before this operation is completed, there is a risk that an incorrect determination will be performed. Therefore, the control unit 21 performs the routine shown in FIG. 3 to correctly make the determination of the interlock tendency and release pressure of one of the frictional elements A, B.

Figure 3:
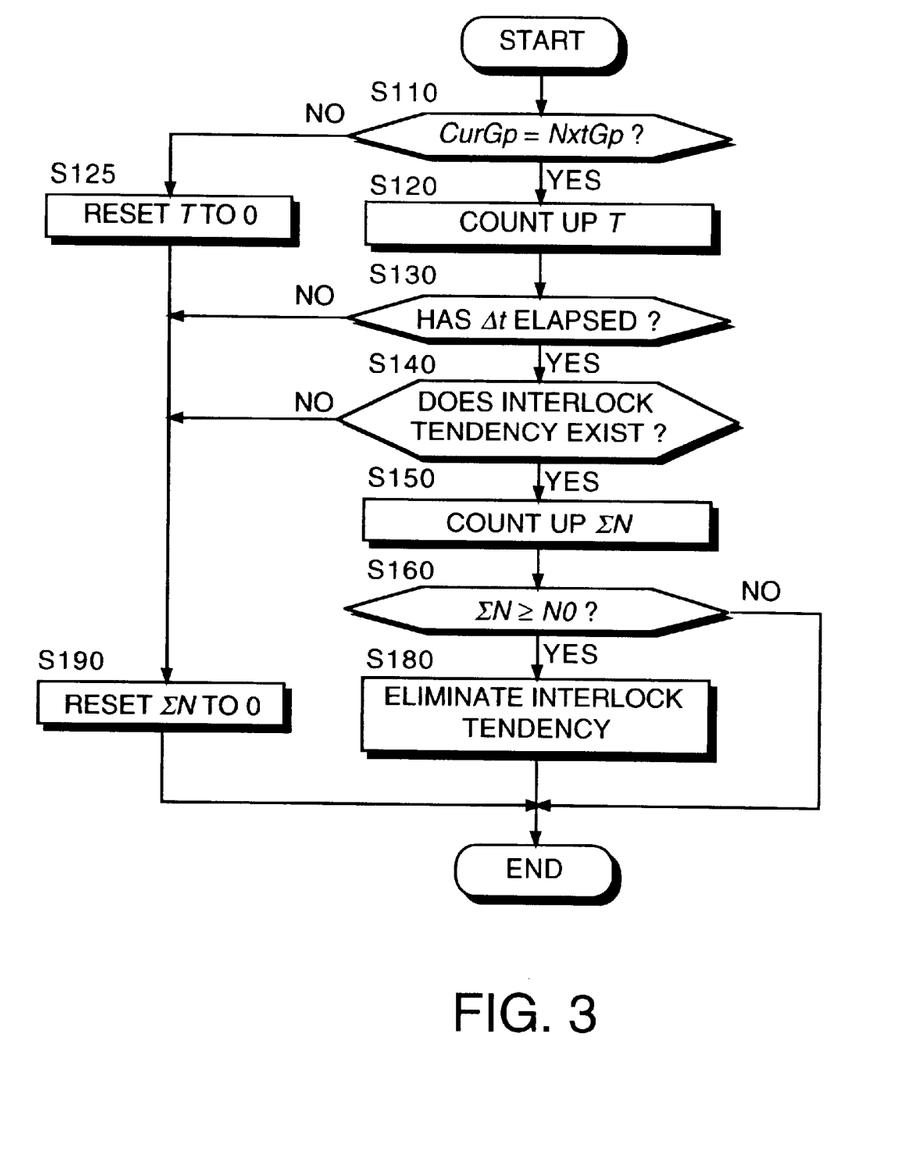
FIG. 3 is a flowchart describing a routine for determining an interlock tendency and eliminating the interlock tendency performed by the controller according to this invention.

This routine is performed at an interval of 10 milliseconds when the vehicle is running.

First, in a step S110, it is determined whether or not a gear change-over, i.e., a change-over of the motive transmission path of the automatic transmission, is complete. This determination is performed by comparing a current gear position CurGp of the automatic transmission and a target gear position NxtGp obtained from the aforesaid gear selection map.

Specifically, it is determined that the change-over is complete when the current gear position CurGp coincides with the target gear position NxtGp, and that the change over is still in progress when they do not coincide. The current gear position CurGp is determined from the ratio of the input rotation speed Ni and output rotation speed No of the automatic transmission.

When it is determined in the step S110 that the change-over of the automatic transmission is complete, the routine proceeds to a step S120. When it is determined that the change-over is not complete, the routine resets a timer value T to zero in a step S125, and proceeds to a step S190.

In the step S120, the timer value T is counted up, and the routine proceeds to a step S130.

In the step S130, it is determined whether or not a predetermined time $\Delta t$ has elapsed from when the change-over of the automatic transmission was complete, i.e., whether or not the timer value T is equal to or greater than the predetermined time $\Delta t$.

In the change-over operation of the automatic transmission, a high pressure is made to act on one of the frictional elements, and the high pressure which was acting on the other frictional element is released. If it is determined whether or not there is an interlock tendency by comparing the input signals of the pressure switches 24, 25 before this pressure variation is completed, an incorrect determination may occur. Hence, the predetermined time $\Delta t$ from when the change-over operation is complete is considered as an incorrect determination time region, and a determination is not made in this region.

When it is determined in the step S130 that the predetermined time $\Delta t$ from completion of change-over has elapsed, the routine proceeds to a step S140. When it is determined that the predetermined time Δt from completion of change over has not elapsed, the routine proceeds to the step S190.

In the step S140, it is determined whether or not there is an interlock tendency of the automatic transmission by comparing input signals from the pressure switches 24, 25.

Figure 6:
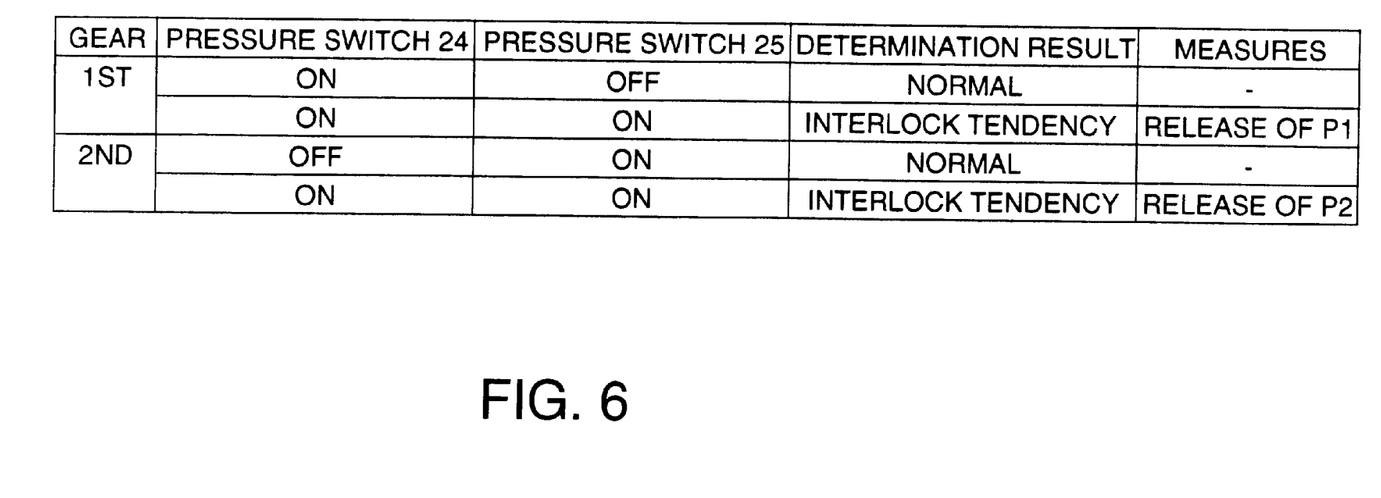
FIG. 6 is a table listing interlock tendency determination results and interlock tendency eliminating measures applied in the routine.

This determination will be described referring to FIG. 6. First, as can be seen from the table in FIG. 2, in first gear, the frictional element A is locked at high pressure, and the frictional element B is at low pressure and unlocked. As a result, in first gear, the signal from the pressure switch 24 should be ON and the signal from the pressure switch 25 should be OFF as shown by the table of FIG. 6.

On the other hand, when the signal from the pressure switch 25 is ON, it is determined that the automatic transmission has an interlock tendency.

Likewise, in second gear, the frictional element A is at low pressure and unlocked, while the frictional element B is locked by high pressure. As a result, in second gear, the signal from the pressure switch 24 should be OFF, and the signal from the pressure switch 25 should be ON. When the signal from the pressure switch 24 is ON, it is determined that the automatic transmission has an interlock tendency.

Now, when it is determined in the step S140 that there is an interlock tendency, the routine proceeds to a step S150. When it is determined that there is no interlock tendency, the routine proceeds to the step S190.

In the step S150, a count number ΣN is counted up.

In a next step S160, it is determined whether or not the count number ΣN has reached a threshold value N0. When the count number ΣN has reached the threshold value N0, the routine proceeds to a step S180. When the count number ΣN has not reached the threshold value N0, the routine is terminated.

In the step S180, processing is performed to eliminate the interlock tendency. Referring to FIG. 6, the interlock tendency occurs in first gear when the pressure switch 25 is ON. In this case, a fault or incorrect operation of the valve 14 or solenoid 19 can be expected. The routine then drives the valve 13 via the solenoid 18 to eliminate the interlock tendency by releasing the oil pressure acting on the frictional element A to the drain. On the other hand, the interlock tendency occurs in second gear when the pressure switch 24 is ON. In this case, a fault or incorrect operation of the valve 13 or solenoid 18 can be expected. The routine then drives the valve 14 via the solenoid 19 to eliminate the interlock tendency by releasing the oil pressure acting on the frictional element B to the drain. After the processing of the step S180, the routine is terminated.

When the timer value T is reset in the step S125, when it is determined in the step S130 that the predetermined time Δt from when the automatic transmission has completed the change-over, has not elapsed, and when it is determined in the step S140 that there is no interlock tendency in the automatic transmission, the routine proceeds to the step S190. Here, the count number ΣN is reset to 0 and the routine is terminated.

Next, the prevention of incorrect determination when there is a change over from second gear to first gear under this control will be described referring to FIGS. 4A–4D and FIG. 5.

Figure 5:
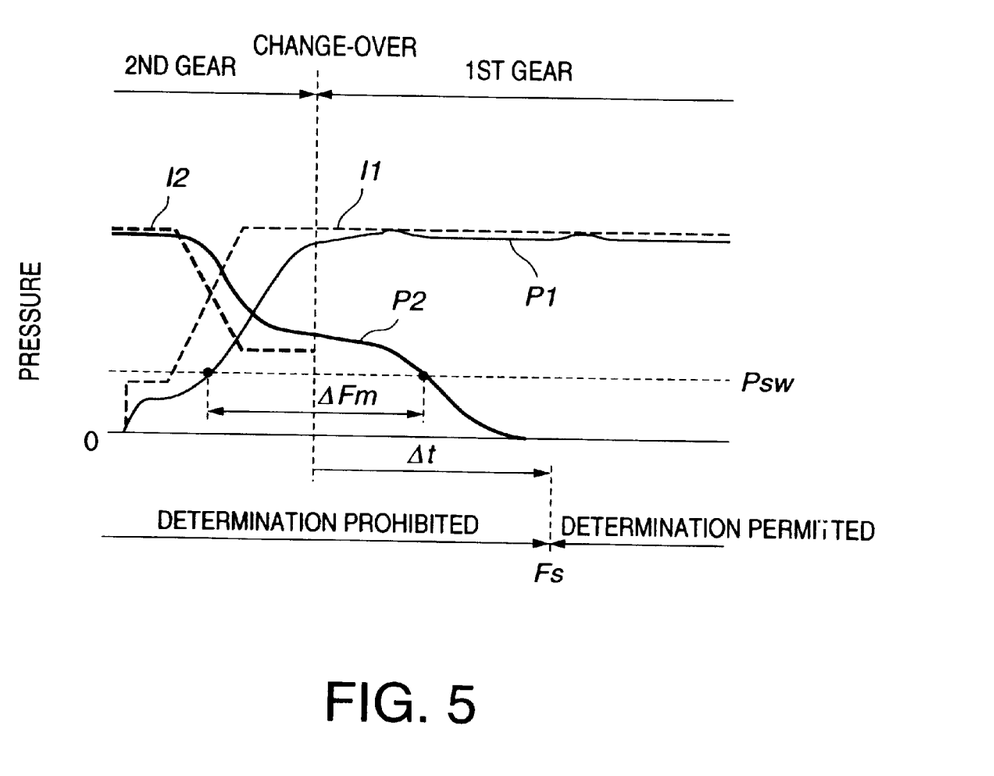
FIG. 5 is a timing chart describing various pressure variations according to execution of the routine by the controller.

When the control unit 21 outputs a command signal /1 to the solenoid 18 and outputs a command signal /2 to the solenoid 19 based on the target gear position NxtGp as shown in FIG. 5, the valve 13 causes the oil pressure of the oil pressure source 17 to act on the frictional element A, and the valve 14 releases the oil pressure which was acting on the frictional element B to the drain. As a result, the frictional element A which was in the unlocked state, is locked, the frictional element B which was in the locked state is unlocked, and a gear position change-over takes place. Due to this change-over, an oil pressure P1 which acts on the frictional element A increases, and an oil pressure P2 which acts on the frictional element B decreases. When the increasing pressure P1 exceeds the predetermined pressure Psw, the output signal of the pressure switch 24 changes from OFF to ON. Likewise, when the decreasing oil pressure P2 falls below the predetermined pressure Psw, the output signal of the pressure switch 25 changes from ON to OFF.

In a region ΔFm between these two change-over points, the output signals of the pressure switches 24, 25 are both ON even if the speed ratio controller shown in FIG. 1 is functioning correctly, and if a determination of interlock tendency is performed based on the output signals of the pressure switches 24, 25, an incorrect determination will be made. Here, the rate of pressure decrease when the valves 13, 14 have released the oil pressure acting on the frictional elements A, B to the drain, varies according to the temperature, and in the low-temperature state, the pressure tends to decrease slowly.

Therefore, the aforesaid predetermined time Δt is set to have a predetermined tolerance relative to this incorrect determination region ΔFm as shown in FIG. 5. Until the predetermined time Δt from change-over of gear position has elapsed, i.e., until a point Fs in FIG. 5 is reached, the control unit 21 prohibits determination of the interlock tendency by the above routine. Due to this measure, the risk that a pressure state appearing transiently during a normal change-over operation of the automatic transmission, will be incorrectly determined as an interlock tendency, is eliminated.

Figure 4A:
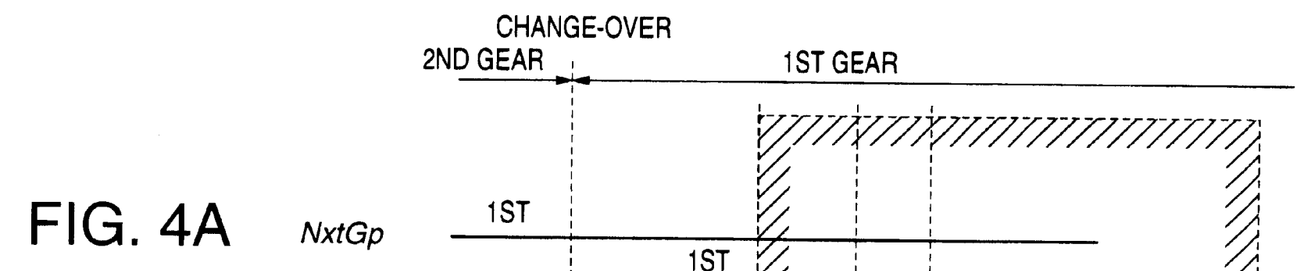
FIGS. 4A–4D are timing charts describing the detection of the interlock tendency and elimination of the interlock tendency according to the routine performed by the controller.
Figures 4B, 4C:
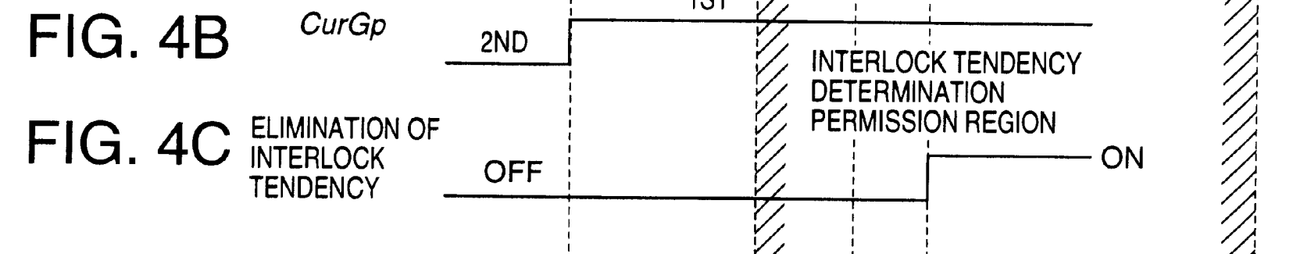
Figure 4D:
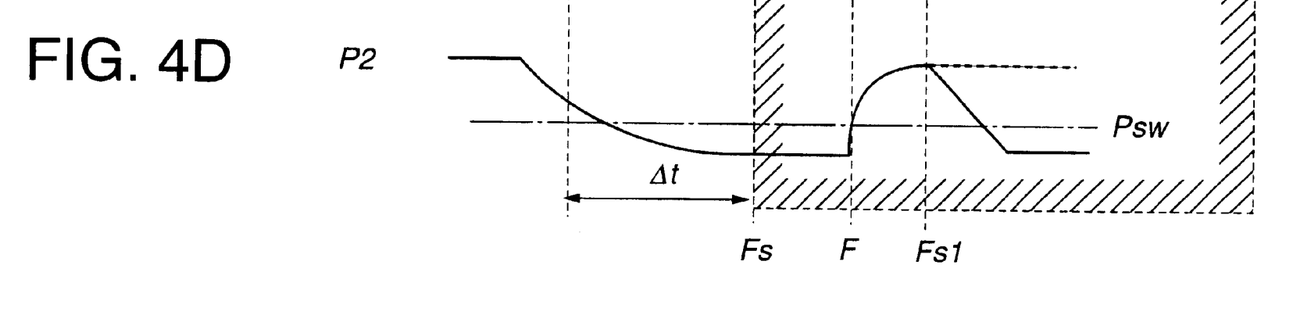

After the predetermined time Δt has elapsed, if the oil pressure P2 increases for some reason, the signal from the pressure switch 25 goes ON when the oil pressure P2 exceeds the predetermined pressure Psw, as shown in FIG. 4D. If the routine verifies that this state has continued for a predetermined number of times when the routine was executed corresponding to the count number ΣN, it performs an operation to eliminate the interlock tendency at a point Fs1 as shown in FIG. 4C. Specifically, the valve 14 is operated via the solenoid 19 such that the oil pressure acting on the frictional element B is released to the drain.

In this way, when there is a gear change-over of the automatic transmission, the interlock tendency is determined while definitively avoiding the incorrect determination region Fm, so the determination of interlock tendency can be accurately performed.

Further, the predetermined pressure Psw was set to a value less than the pressure of the return spring elastically supporting the frictional elements A, B against the oil pressure, so the interlock tendency can be detected early, and burn-up or serious wear of the frictional elements A, B can be prevented. Still further, when the interlock tendency is detected, first gear or second gear is forcibly applied by releasing the oil pressure correctly acting on either of the frictional elements A, B, so the vehicle can maintain the running state without giving further damage to the frictional elements A, B.

The contents of Tokugan Hei 11-296119, with a filing date of Oct. 19, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the aforesaid embodiment, the invention was applied to an automatic transmission having only first gear and second gear in the drive range (D), but this invention may also be applied to an automatic transmission comprising a larger number of gear positions or frictional elements. Further, the invention is not limited to determination of interlock tendency, and may also be applied to determination of various anomalies based on the output signals of the pressure switches 24, 25.

The embodiments of this invention in which an exclusive property or privilege is claimed are defined as follows:

What is claimed is:

1. A fault determining device for an automatic transmission which changes over a gear position by selectively applying a fluid pressure to one of plural frictional elements while releasing a fluid pressure acting on the other of the plural frictional elements, comprising:
  a pressure sensor which detects a fluid pressure acting on each of the frictional elements;
  a sensor which detects a completion of a gear position change-over of the automatic transmission; and
  a microprocessor programmed to:
    determine a fault of the automatic transmission based on a detected fluid pressure; and
    prohibit determination of the fault when the gear position change-over is not complete.

2. A fault determining device as defined in claim 1, wherein the sensor which detects the completion of the gear position change-over comprises a sensor which detects a real gear position of the automatic transmission, and the microprocessor is further programmed to determine that the gear position change-over is not complete when the real gear position does not coincide with a preset target gear position.

3. A fault determining device as defined in claim 2, wherein the microprocessor is further programmed to prohibit the determination of the fault until a predetermined time has elapsed after completion of the gear position change-over.

4. A fault determining device as defined in claim 3, wherein the predetermined time comprises a timing at which a fluid pressure which should decrease due to a gear position change-over becomes equal to or less than a predetermined pressure.

5. A fault determining device as defined in claim 1, wherein the fault comprises an interlock tendency wherein fluid pressures equal to or greater than a predetermined pressure simultaneously act on a predetermined number of the frictional elements, and the microprocessor is further programmed to determine that an interlock tendency exists when fluid pressures acting on the predetermined number of the frictional elements are equal to or greater than the predetermined pressure.

6. A fault determining device as defined in claim 5, wherein the automatic transmission comprises a valve which individually increases and decreases the fluid pressures acting on the plural frictional elements, and the microprocessor is further programmed to perform control of the valve to eliminate the interlock tendency when the interlock tendency is determined to exist.

7. A fault determining device as defined in claim 6, wherein the microprocessor is further programmed to prohibit control of the valve to eliminate the interlock tendency until the interlock tendency has been continuously determined to exist for a predetermined number of times.

8. A fault determining device as defined in claim 6, wherein the device further comprises a sensor which detects a real gear position of the automatic transmission, and the microprocessor is further programmed to identify a frictional element on which the fluid pressures act normally based on the real gear position of the automatic transmission and a preset fluid pressure pattern for each gear position, and eliminate the interlock tendency by controlling the valve to decrease the fluid pressure acting on the identified frictional element.

9. A fault determining device for an automatic transmission which changes over a gear position by selectively applying a fluid pressure to one of plural frictional elements while releasing a fluid pressure acting on the other of the plural frictional elements, comprising:
  means for detecting a fluid pressure acting on each of the frictional elements;
  means for detecting a completion of a gear position change-over of the automatic transmission;
  means for determining a fault of the automatic transmission based on a detected fluid pressure; and
  means for prohibiting determination of the fault when the gear position change-over is not complete.

10. A fault determining method for an automatic transmission which changes over a gear position by selectively applying a fluid pressure to one of plural frictional elements while releasing a fluid pressure acting on the other of the plural frictional elements, the method comprising:
  detecting a fluid pressure acting on each of the frictional elements;
  determining a fault of the automatic transmission based on the detected fluid pressure;
  determining whether or not a gear position change-over of the automatic transmission is complete; and
  prohibiting determination of the fault when the gear position change-over is not complete.

* * * * *